(12) United States Patent
Galecki et al.

(10) Patent No.: US 6,362,943 B1
(45) Date of Patent: Mar. 26, 2002

(54) ACTIVE CURRENT LIMITER

(75) Inventors: Steven M. Galecki, Mentor; Victor A. Falk, Westlake, both of OH (US)

(73) Assignee: Marconi Communications, Inc., Cleveland, OH (US)

( * ) Notice: Subject to any disclaimer, the term of this patent is extended or adjusted under 35 U.S.C. 154(b) by 0 days.

(21) Appl. No.: 09/630,715

(22) Filed: Aug. 2, 2000

Related U.S. Application Data

(62) Division of application No. 09/480,797, filed on Jan. 10, 2000, which is a continuation of application No. 08/997,443, filed on Dec. 23, 1997, now abandoned, which is a continuation of application No. 08/607,239, filed on Feb. 26, 1996, now Pat. No. 5,706,157.

(51) Int. Cl.[7] .................................................. H02H 3/00
(52) U.S. Cl. ......................... 361/93.9; 361/98; 361/93.1
(58) Field of Search .............................. 361/63, 65, 56, 361/57, 71, 75, 91.2, 91.3, 93.4, 93.7, 93.9, 98; 455/39, 61.7

(56) References Cited

U.S. PATENT DOCUMENTS

| | | |
|---|---|---|
| 3,579,036 A | 5/1971 | McCoy |
| 3,729,671 A | 4/1973 | Jeffrey et al. |
| 4,173,714 A | 11/1979 | Bloch et al. |
| 4,222,097 A | 9/1980 | Rogowsky |
| 4,311,986 A | 1/1982 | Yee |
| 4,438,473 A | 3/1984 | Cawley et al. |
| 4,458,288 A | 7/1984 | Chapman, Jr. et al. |
| 4,620,271 A | 10/1986 | Musil |
| 4,638,396 A | 1/1987 | Mukli et al. |
| 4,733,325 A | 3/1988 | Loeech |
| 4,736,269 A | 4/1988 | Amein et al. |
| 4,926,288 A | 5/1990 | Bradley |
| 4,935,642 A | 6/1990 | Obelode et al. |
| 5,117,219 A | 5/1992 | Tice et al. |
| 5,144,544 A | 9/1992 | Jenneve et al. |
| 5,239,255 A | 8/1993 | Schanin et al. |
| 5,301,050 A | 4/1994 | Czerwiec et al. |
| 5,329,142 A | 7/1994 | Kitagawa et al. |
| 5,347,417 A | 9/1994 | Motoori |
| 5,440,441 A * | 8/1995 | Ahuja ........................ 361/62 |
| 5,465,188 A | 11/1995 | Pryor et al. |
| 5,608,595 A * | 3/1997 | Gourab et al. ................ 361/79 |
| 5,638,244 A | 6/1997 | Mekanik et al. |
| 5,694,283 A | 12/1997 | Huczko |
| 5,706,157 A | 1/1998 | Galecki et al. |
| 5,751,530 A | 5/1998 | Pelly et al. |

OTHER PUBLICATIONS

Bellcore Technical Advisory TA–NWT–001500, entitled, "Generic Requirements for Power Optical Network Units in Fiber–In–The Loop Systems", Issue 1, Dec. 1993.

* cited by examiner

*Primary Examiner*—Kim Huynh
(74) *Attorney, Agent, or Firm*—Jones, Day, Reavis & Pogue

(57) ABSTRACT

An active current limiter controls the flow of current between a power source and a load. The active current limiter includes a power switch coupled between the power source an the load, a current sensor coupled between the power source and the load to sense the level of current flow through the power switch, and one or more fault detection circuits coupled to the current sensor for sensing one or more current fault conditions between the power source and the load and configured to switch of the power switch when a current fault condition is detected.

19 Claims, 6 Drawing Sheets

ACTIVE CURRENT LIMITER

This application is a divisional of U.S. patent application Ser. No. 09/480,797 filed on Jan 10, 2000 which is a continuation of U.S. patent application Ser. No. 08/997,443 filed on Dec. 23, 1997 now abandoned, which is a continuation of Ser. No. 08/607,239, filed on Feb. 26, 1996, now U.S. Pat. No. 5,706,157.

BACKGROUND OF THE INVENTION

This invention pertains to the art of power and signal distribution and, more particularly, to a communication power distribution system with current limiting capabilities.

The invention is particularly applicable to controlling fiber-to-the-curb distribution of power and transmission of signals from a central office to a desired destination in accordance with existing electric code requirements. However, it is to be appreciated that the application has broader applications and may be advantageously employed in other power distribution environments and uses.

In supplying power to end users such as homes, businesses, etc., electrical safety considerations need to be addressed. The National Electric Safety Code allows the distribution of power on a "utility right of way" The term "utility right of way" as used in this context is meant to define the geographic area where utility companies have the right to run power lines, prior to entry into homes, businesses, etc. When this distributed power is led off the "utility right of way", into a home, business, etc. Other regulations take effect, such as those set forth in the National Electric Code (see for example table 725-31B, National Electric Code, 1993 Edition).

One type of communication power distribution system is set forth in FIG. 1, which illustrates a typical set-up of a fiber-to-the-curb distribution system. Optical fiber, OF, connects the central office, CO, to the host digital terminal, HDT. The central office is a main switching location and the host digital terminal is an intermediate device which provides remote switching capabilities. Optical fiber, OF, is also used to connect the host digital terminal, HDT, to individual optical network units, ONU. Each optical network unit, ONU, supplies individual lines to a number of users. In this example configuration, an ONU which supplies 12 lines will be used to service four end users (i.e. 3 lines per end user). It is to be appreciated, however, that while in this example 3 lines are provided for an end user, different numbers of lines may be provided.

The local power hub, LPH, supplies power to each of the optical network units, ONUS, via conductors such as 2-pair wire, W.

In the example of FIG. 1, the LPH is on the "utility right of way", and the ONUs supplied by the LPH are off the "utility right of way". Therefore, the output of the LPH must be within parameters set forth in existing code regulations. However, once the distribution system leaves the "utility right of way" other code regulations must be followed.

Prior art systems such as that shown in FIG. 2 have achieved the required power distribution by relying on individual power supplies, PS, to feed each ONU with limited power. Such a system increases the physical size of the local power hub and also increases the cost by requiring a plurality of individual power supplies.

The present invention contemplates a new and improved power distribution system which utilizes a bulk rectifier, and limits power by use of active current limit devices in order to overcome the above-referenced problems and others, and to provide an economically feasible installation.

SUMMARY OF THE INVENTION

In accordance with the present invention, a communication power distribution system is provided which includes a bulk rectifier at a local power hub used to distribute power to a plurality of optical network units. At least one of the lines from the local power hub being connected to an active current limiting device.

A principal advantage of the invention is providing an economical communication power distribution system where the cost of a bulk rectifier is distributed over several optical network units.

Another advantage of the invention is realized by the use of active current limiters to provide active control up to a maximum limit.

Still other advantages and benefits of the invention will become apparent to those skilled in the art upon a reading and understanding of the following detailed description.

BRIEF DESCRIPTION OF THE DRAWINGS

The invention may take physical form in certain parts and arrangements of parts, a preferred embodiment of which will be described in detail in the specification and illustrated in the accompanying drawings which form a part hereof, and wherein.

DETAILED DESCRIPTION OF THE PREFERRED EMBODIMENT

Figure 1:
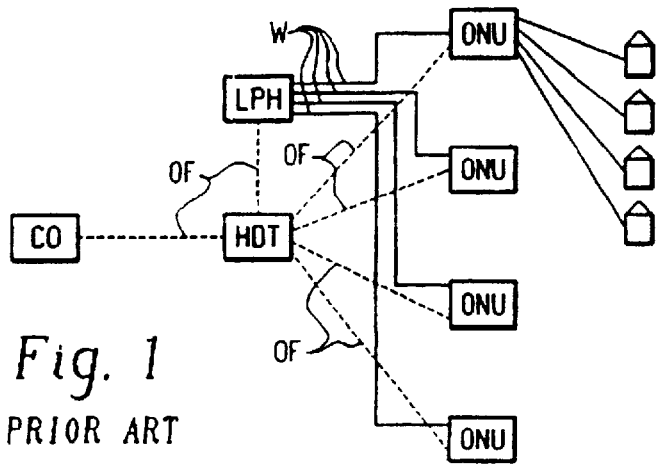
FIG. 1 is an illustration of a typical fiber-to-the-curb configuration.
Figure 2:
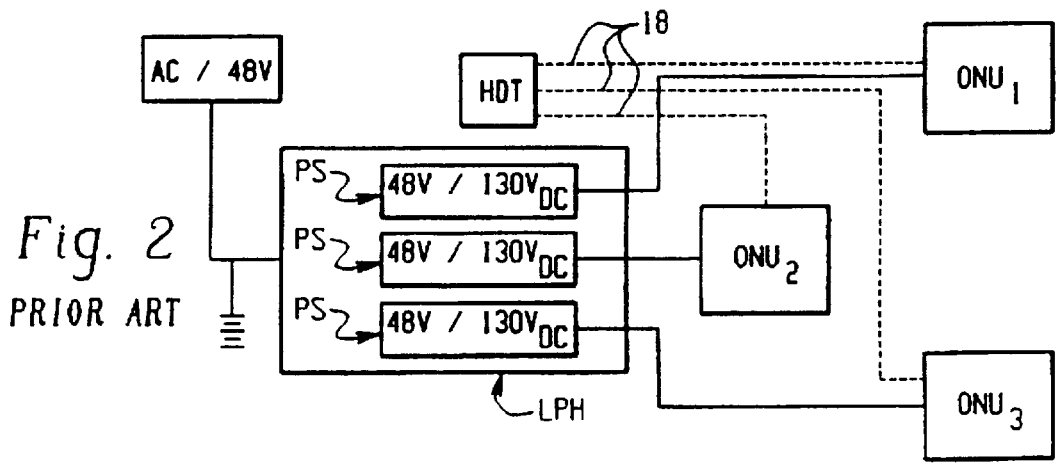
FIG. 2 is an expanded view of a section of FIG. 1 wherein the local power hub depicts a prior art use of a plurality of power supplies individually connected to optical network units.
Figure 3:
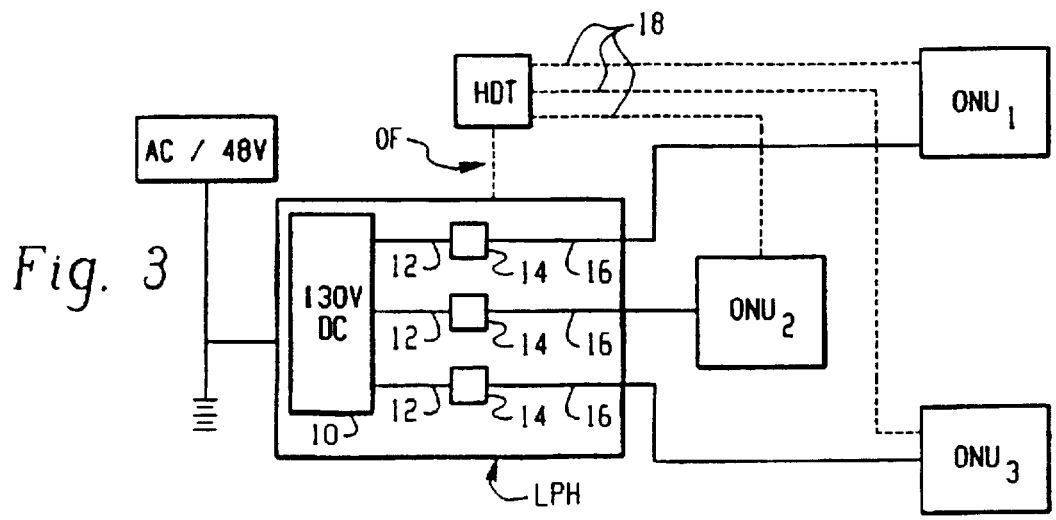
FIG. 3 is an embodiment of the subject invention wherein a local power hub includes a bulk rectifier having individual lines from the rectifier associated with active current limiters.

Referring now to the drawings wherein the showings are for purposes of illustrating the preferred embodiment of the invention only and not for purposes of limiting same, FIG. 3 illustrates a fiber-to-the-curb "star" distribution system from a local power hub, LPH, to a plurality of optical network units, $ONU_1$–$ONU_3$. Within the local power hub is a bulk rectifier 10. Leading from rectifier 10 are a plurality of rectifier output lines 12. Which for example may be 2-wire twisted pair of coaxial cable. A plurality of active current limiters 14 located within the LPH are each connected to a corresponding one of the rectifier output lines 12. Leading from the current limiters 14 are distribution lines 16 which for example may be 2-wire twisted pair or coaxial cable, extending from the LPH module and connected to individual optical network units, $ONU_1$–$ONU_3$. Each of the distribution lines 16 carry current limited power to the individual optical network units, $ONU_{1-3}$. Host digital terminal, HDT, distributes and receives signals to and from the ONUs over optical fiber lines 18.

Through such a distribution arrangement each local power hub, LPH, in a distribution system needs to contain only a single bulk rectifier system 10. By providing active current limiting to the individual distribution lines a compact precise system is designed which increases the ease of configuring the distribution system, and distributes the cost of the bulk rectifier 10 over a plurality of optical network units, ONUs.

The local power hub, LPH, performs four functions. First, it generates a DC voltage to provide power to the ONUs. Next it distributes the power to the different ONUs. Third, it isolates the ONUs from faults such as over-voltage stresses and over-current conditions that any other of the ONUs may experience. Finally it sends alarms and other telemetric information back to the host digital terminal, HDT.

A concern of such communication power distribution systems is that a short circuit on one of the ONU lines will disrupt the power (and, therefore, the service) of other ONUs connected to the local power hub, LPH. Therefore, the configuration of the local power hub, LPH, of the subject invention acts to localize any problems at an ONU to the particular ONU with the problem.

It is to be appreciated that whereas in FIG. 3 the bulk rectifier 10 and the active current limiters 14 are found within the local power hub LPH, in certain environments it may be desirable to provide these elements in a different arrangement. For example, the active current limiter can be placed outside of the LPH in a closer physical proximity to or even within the same housing as the ONUs they are supplying. Still further, while FIG. 3 shows a "star" configuration, the subject invention can be implemented in other arrangements as well.

Active current limiter 14 used in the embodiments can be constructed in a plurality of arrangements. In one particular arrangement active current limiter 14 is configured to address at least three (3) fault conditions. In the first fault condition an unwanted one (1) amp load is, for instance, applied in the system when this occurs current limiter 14 needs to limit the current to less than one (1) amp within sixty seconds. The second fault condition concerns an external AC line cross. Current limiter 14 needs to reduce the current within 200 ms with a 5 amp load applied. This protection reflects the capability of polymer positive temperature coefficient resistors. The third fault condition occurs after a lightening strike on the line between the ONUs and the LPH. The lightening strike will trigger primary over-voltage protection. The over-voltage protection creates a low impedance to ground and shunts the current surge from the lightening to ground. The lightening surge decays within microseconds, but the over-voltage protection will remain on, and shunt the power supply from the LPH to ground, effecting the other ONUs until active current limiter circuit 14 reacts.

Figure 4:
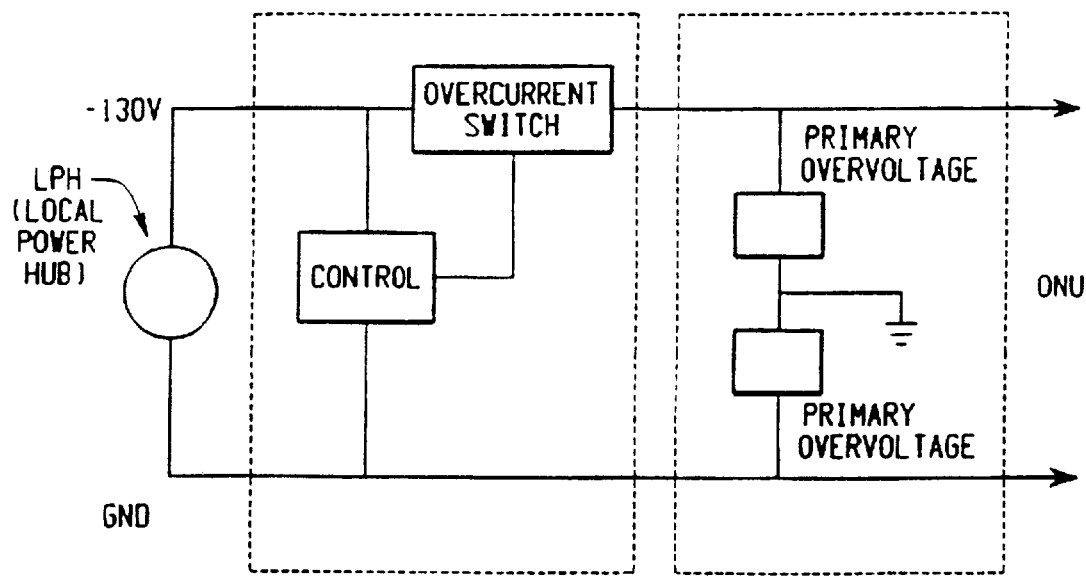
FIG. 4 is a block diagram showing protection circuits in one of the active current limiters between a local power hub and an optical network unit.

FIG. 4 sets forth a block diagram depicting the protection circuits between the local power hub, LPH, and the optical network unit, ONUS. Using these protection circuits the above three fault conditions can be controlled.

Active current limiter 14, which is an over-current protector, not only protects against external line faults and surges, but also allows power supplies of the ONUS to start. Since the power supplies may have relatively large capacitors (up to 450 $\mu$F), active current limiter 14 is required to charge these capacitors while limiting the average load current to 740 mA.

The maximum voltage which will be seen by current limiter 14 depends on the primary over-voltage protection used. The primary over-voltage protection is located in a separate plug-in module and may consist of a solid state device ($V_{max}$=400V) a gas discharge tube ($V_{max}$=750V), or even a carbon block ($V_{max}$=1,000V).

Figure 5:
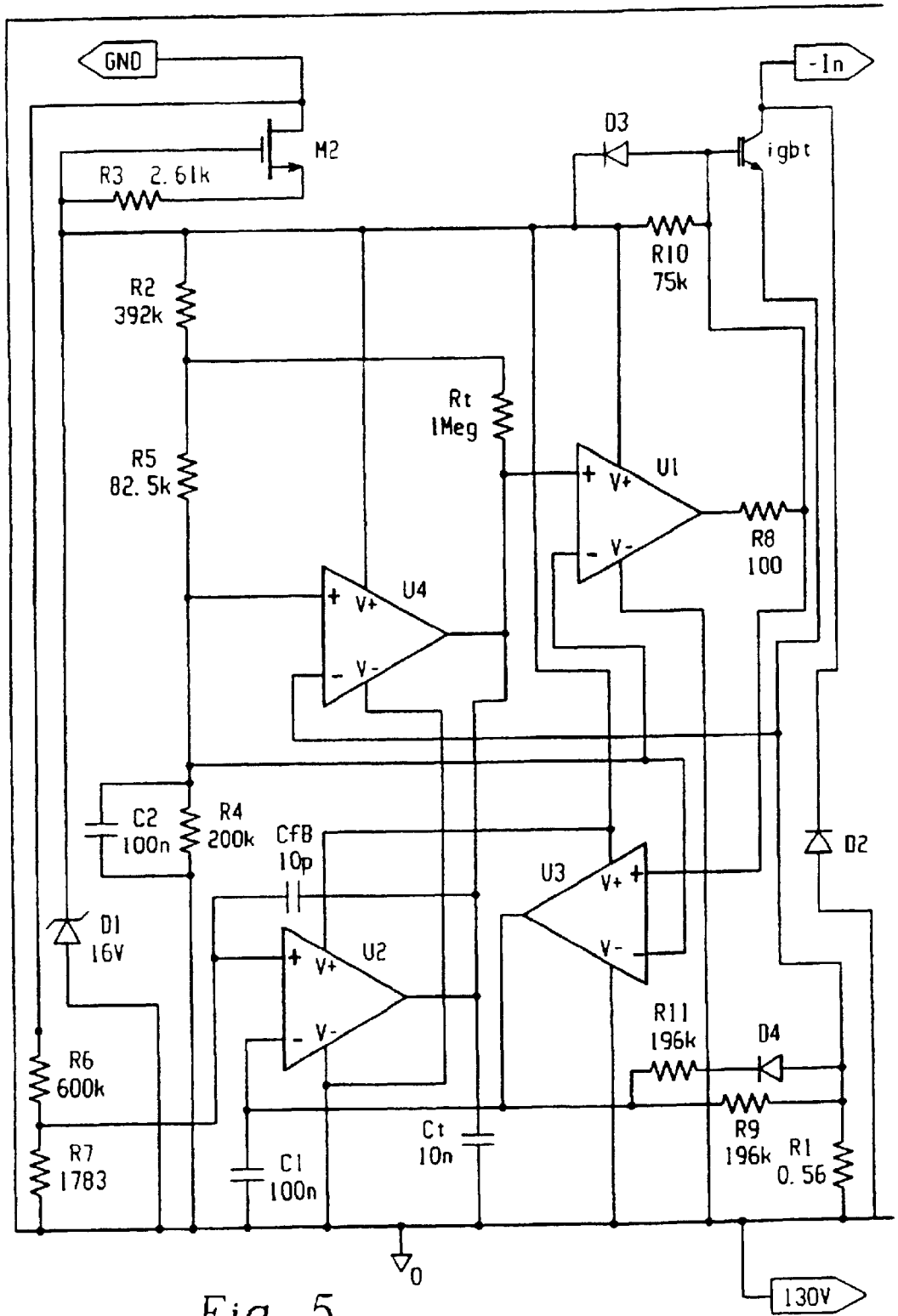
FIG. 5 is a detailed schematic of an active current limiter according to the present invention.
Figure 6A:
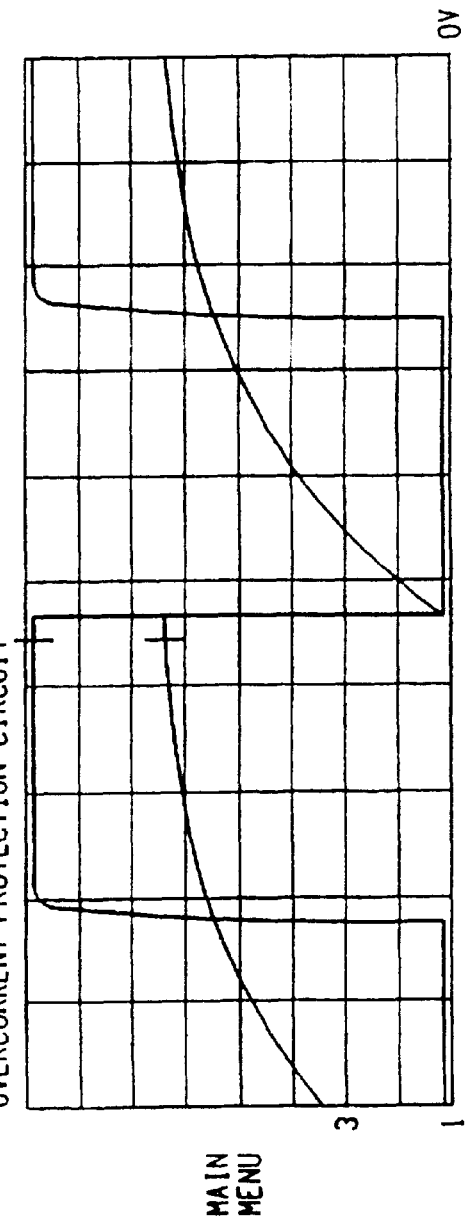
FIGS. 6A–6D are time versus voltage and current graphs of the active current limiter with over-current protection according to the present invention.
Figure 6B:
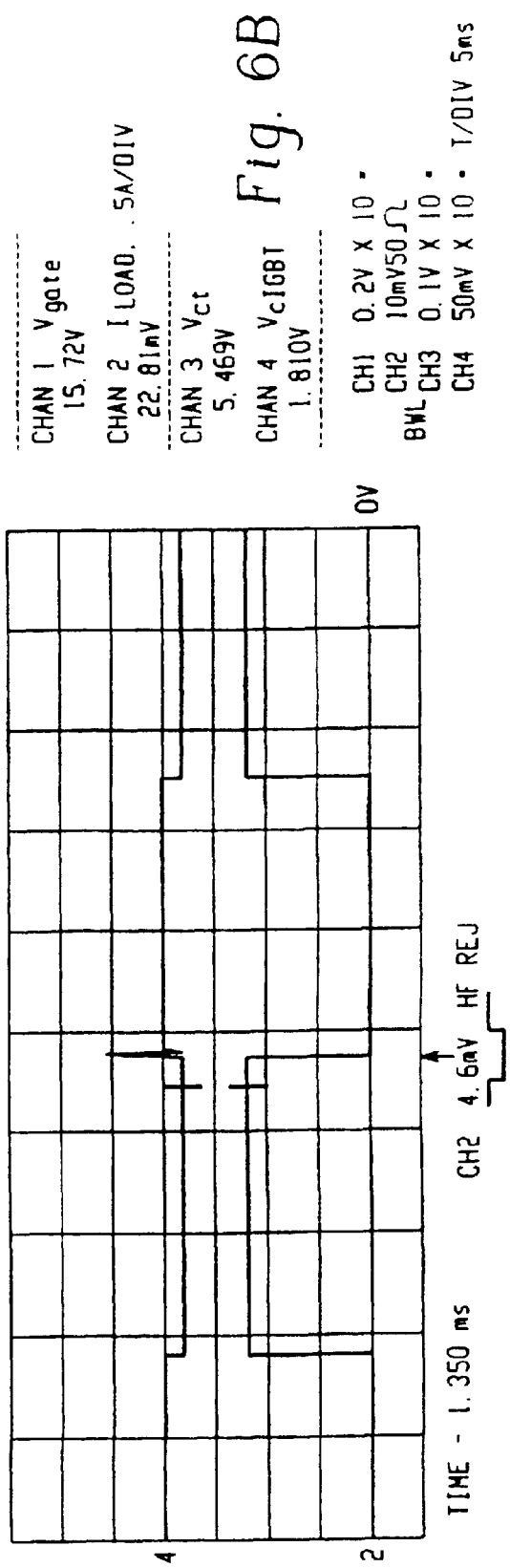
Figure 6C:
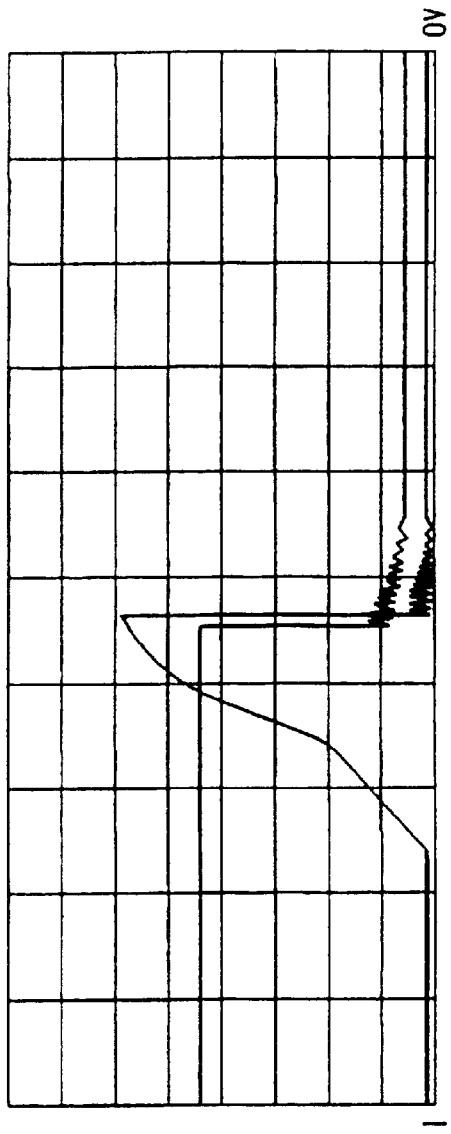
Figure 6D:
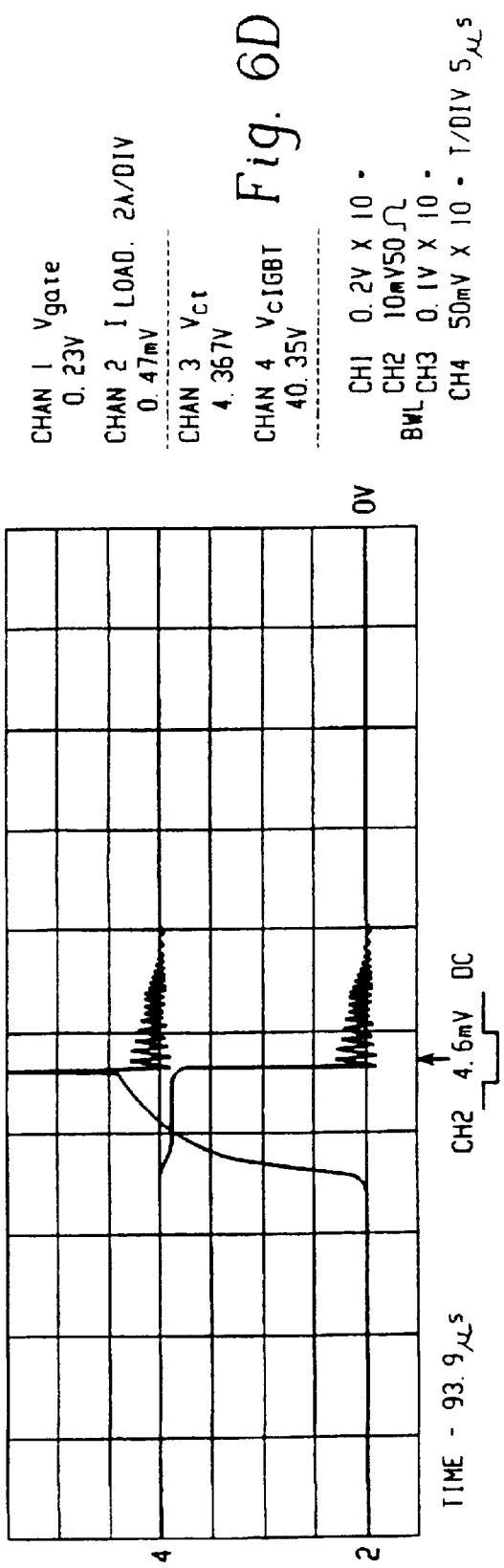

The active current limiter 14 can be divided into six sections, a power switch, current sensing area, control bias, gate alarm, alarm out and reverse current protection. One embodiment of such an over-current protection circuit i.e. active current limiter 14 is depicted in FIG. 5. While FIG. 5 does not show an error alarm, an additional MOSFET, with its gate connected to the gate of IGBT, can be used to provide a high impedance status signal. Connecting an indication light to the MOSFET'S drain to ground would therefore provide an 'on' indication. Active current limiter 14 of FIG. 5 reacts to short circuits in less than 10 ms and resets in 11 ms, averaging less than 740 mA of current passing through it during a fault condition. The power switch of current limiter 14, is implemented as an IGBT. For this IGBT the minimum breakdown voltage rating is the same as the maximum over-voltage protection rating of 1,000V.

Current sensing is accomplished by a low inductance resistor R1. This resistor allows each of the ONUs' capacitors to charge. The current signal is filtered by a variable time constant filter consisting of R11, R9, C1 and D4. When the load current is less than 1 amp, the filtered time constant is 20 ms. When the load current is greater than 1 amp, the filter time constant decreases to 10 ms. The faster time constant lowers the average current and power on the IGBT for larger currents.

Comparator U4 turns off the IGBT quickly whenever very high current passes through the IGBT. This action prevents the IGBT from overheating when it leaves the linear region. The threshold of U4 should, therefore, occur at some point below the saturated current level of the IGBT. R2, R5 and R4 and a zener clamp voltage from diode D1 determine the threshold voltage on comparator U4. Capacitor C2 is used to reduce the noise on the threshold voltage. Resistor Rt provides positive feedback for comparator U4 when the comparator is to switch.

Data gathered from a current limiter as described above, with 4.37V threshold for fast turn-off, includes:

| ($t_{on}$/ms) | $I_{load}$/amps |
| --- | --- |
| 65.30 | 0.8 |
| 20.73 | 1.0 |
| 7.88 | 1.5 |
| 4.59 | 2.0 |
| 3.18 | 2.5 |
| 2.44 | 3.0 |
| 2.01 | 3.5 |
| 1.70 | 4.0 |
| 1.26 | 5.0 |
| 1.034 | 6.0 |
| 0.853 | 7.0 |
| 0.766 | 8.0 |
| 0.029 | 8.4 |

FIGS. 6A–6D provide graphs of data for the active current limiter of FIG. 5, wherein channel 1 is gate voltage ($V_{gate}$), channel 2 is a current load ($I_{load}$), channel 3 is the voltage across capacitor, and channel 4 is the voltage across the current limiter.

Figure 7:
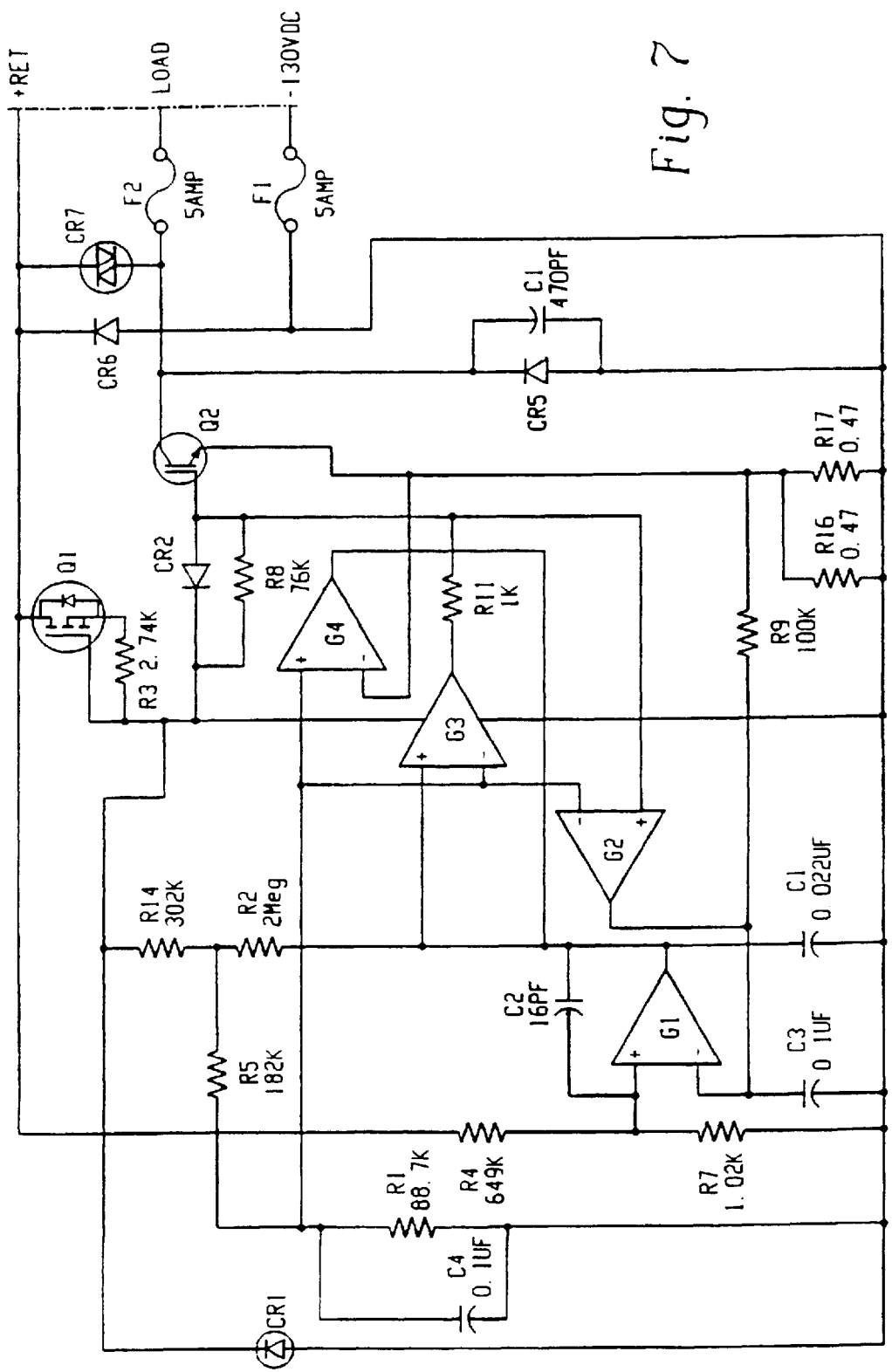
FIG. 7 is a schematic of another embodiment of an active current limiter.

FIG. 7 discloses an alternative current limiter circuit for a fiber-in-the-loop configuration (FITL). While this circuit is similar to that of FIG. 5 it is configured to limit heating occurring in the circuit and to provide secondary current protection.

Returning attention to the circuit depicted in FIG. 5, $$t_{on} = -\tau * \ln\left(1 - \frac{V_{threshold}}{R_1 \times I_{on}}\right)$$

where, $\tau$ is a filter time constant, $I_{on}$ is current through the sense resistor R1, and $V_{threshold}$ is the reference voltage determined by the resistor divider string R6 and R7. The average current can then be calculated as:

$$I_{ave} = I_{on} \times \frac{t_{on}}{t_{on} \times t_{reset}}.$$

The reset time of the circuit is less than the filter time constant, so comparator U3 resets the filter whenever the IGBT is off.

Comparator U2 changes state whenever the voltage on the filter capacitor, C1, exceeds the threshold voltage. Capacitor Cfb provides positive AC feedback to insure proper switching. The threshold voltage is determined by a resistor divider string (R6 and R7) and power supply which in this example is taken to be 135V. The following relationship determines the DC load current:

$$I_{load} = \frac{V_{ps} * \frac{R7}{R7 + R6} + V_{offset\_U2}}{R1}.$$

Variations in the source voltage, resistor divider string, comparator offset and the sense resistor determine the minimum guaranteed load current which may be calculated by:

$$I_{load\_min} = I_{load\_max} \cdot \frac{100 - 2 * \partial_{R1} - 2 * \partial_{RS} - \partial_{ps}}{100} * \left[1 - \frac{2 * V_{off\_u2}}{V_{ps} * \frac{R7}{R7 + R6}}\right]$$

where, $I_{load\_min}$: Guaranteed maximum DC load current; 0.63 A
$I_{load\_max}$: Maximum current allowed out of LPH; 100 VA/135V=0.741 A
$\partial_{R1}$: Percent tolerance error of sense resistor over temperature and devices; 1.5%
$\partial_{RS}$: Percent ratio mismatch between R6 and R7 over temperature and devices; 0.5%
$\partial_{ps}$: Percent variation of 135 Volt power supply; 6%
$V_{off\_u2}$: Maximum offset voltage of comparator U2; 9 mV The voltage drop across the load and external wiring will depend upon current as well as the "on" voltage of the IGBT and the source power supply, and may be described as:

$$V_{load} = V_{ps} - V_{on\_IGBT} - I_{load} * R1.$$

The minimum load voltage will be 125 volts and the minimum guaranteed power to the load and external wiring will be 80VA.

The current sense resistor R1 also limits the peak current through the IGBT. As the load current increases, the voltage across R1 increases. Since the voltage on the gate of the IGBT stays the same, the gate-emitter voltage on the IGBT decreases. In this arrangement the saturation current through IGBT is related to the gate-emitter voltage. The value of R1 is selected to limit the current through IGBT to 12 amps.

With continuing reference to FIG. 5, control of the gate of IGBT switch is now set forth. Resistor R8 and comparator U1 are used to turn off the gate of IGBT. Comparator U1, an open collector comparator, pulls the gate low whenever its positive input goes below a threshold voltage. Resistor R10 pulls up the gate to the potential on the 16V zener D1. The lower the value of resistor R10, the faster IGBT turns on and the sense circuit detects a short. The faster IGBT turns on, the larger the current required to flow through M2. Diode D3 clamps the voltage on the gate to the zener's potential where diode D3 is used to protect the gate from voltages coupled across the collector-gate capacitance.

The positive input of comparator U1 switches to a low voltage whenever comparator U2 senses a fault. When the fault clears, an RC network determines how long the gate stays off. The reset time should be less than 16.6 ms but greater than 8.33 ms which allows the circuit to synchronize with any 60 Hz fault conditions. The circuit restarts during reverse current conditions and turn-off of the circuit will occur when forward current flows through the IGBT, i.e. at a low-voltage low-current condition. The above described arrangement will minimize the power dissipated by the IGBT during a situation of high-voltage line cross.

Rt, Ct, R2, R4 and C2 determine the reset time of the gate, i.e. $t_{reset}$. The simplest method of varying the reset time is by varying Ct, whereby the reset time, is increased by increasing the value of Ct. In the same manner to decrease the reset time, the value of Ct is decreased. It is to be appreciated that the other components in the network also affect the amount of positive feedback for U4.

The control bias of the subject circuit is provided by M2, R3, and D1. D1 is a 16 volt zener diode that clamps the Vcc voltage for the comparator and the IGBT gate to 16 volts. M2 is a 500 volt depletion mode transistor that acts as a current source. Using this current source provides a clean start-up of the circuit. However, it is to be appreciated that it would be possible to also use a bias resistor in place of the current source.

R3 determines the amount of current flowing through M2, wherein the minimum current flowing through M2 must supply the comparators, resistor voltage divider, and resistor pull-ups during a low threshold voltage condition. A comparator which may be used is the LP339, which requires no more than 100 microamps bias current. The other resistors all have high impedances to minimize the current drain through the depletion mode transistor. By minimizing M2 the current drain through M2 minimizes the heat generated from the control section.

The subject circuit of FIG. 5 is also provided with reverse current/voltage protection. This portion of the circuit includes diode D2 which is a 1,000 volt diode used to protect against over-current situations in case of a reverse current. If the current should flow in the reverse direction, D2 limits the voltage across the circuit to one volt. The local power hub, LPH, would then absorb all the reverse current. If it is desired that no reverse current flow into the local power hub, then D2 is connected (by itself) to −130V instead of a negative input position.

In configuring the current limiter 14 for use in the subject invention, it is important to also take thermal conditions into consideration. The power dissipated by the circuit is crucial for two reasons: the heating of the devices on the circuit and the heat load presented to the rest of the system.

The thermal impedance of the devices to air will be approximately 14.3° C./watts, and depend upon the air flow across the circuit. If the circuit dissipates 1.4 watts, the temperature of the device will increase from an ambient temperature of 65° C. to 85° C. Most devices used are rated for a maximum of 85° C. The circuit shown in FIG. 5 has the IGBT dissipating 0.9 watts, the sense resistor R1 dissipating 0.3 watt, and the control section dissipating 0.2 watt.

The heat load of one circuit to the entire local power hub, LPH, system may not be overly significant, however, the LPH may have up to one hundred of these protector modules. That number of modules can impose a significant heat load, therefore heating of each protector module must be minimized.

It should be noted that the current limiter 14 may experience troubles starting up the capacitive loads expected in the external ONU's power supply. The circuit cannot distinguish between a capacitor placed close to the LPH and an external short. The circuit must protect itself in case of a short circuit and will turn off quickly when the current through the switch exceeds eight (8) amps. The short duration of current may not be enough to charge the capacitors on the ONUs.

For currents less than eight (8) amps, the over-current protection circuit will average approximately 0.74 A into the load. Capacitor loads must not discharge completely while the protection circuit is in the reset mode. This will allow the protection circuit to "ratchet" the voltage across the capacitor up.

Figure 8:
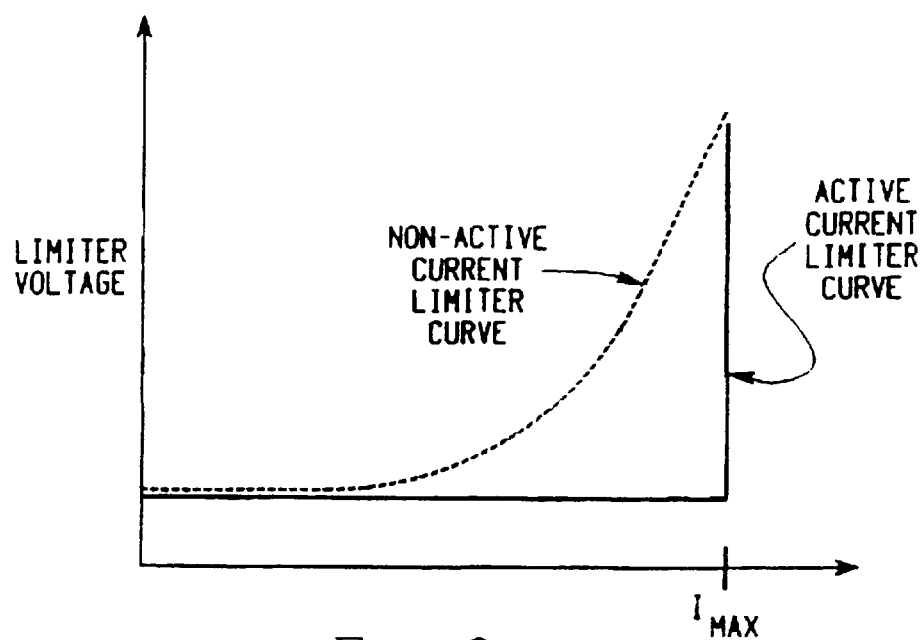
FIG. 8 is a graph comparing active versus non-active current limiter action.

By using one of the current limiters disclosed in FIG. 5 or 7, active current limiting is achieved. This results in the ability to provide accurate control of current out to a defined limit. On the otherhand, non-active current limiters begin to lose control of the current prior to the predetermined limit; this difference is depicted in FIG. 8. By use of active current limiters 14 a precise power distribution system using a single bulk rectifier is developed.

The invention has been described with reference to the preferred embodiment. Obviously, modifications and alterations will occur to others upon a reading and understanding of this specification. It is intended to include all such modifications and alterations insofar as they come within the scope of the appended claims or the equivalents thereof.

Having thus described the invention, it is now claimed:

1. A circuit for limiting the flow of current over a power distribution line that couples a power hub to a remote unit, the circuit comprising:
   a power switch coupled between the power hub and the remote unit;
   a current sensor coupled between the power hub and the remote unit for sensing the current level flowing through the power switch, wherein the current sensor biases the gate of the power switch such that the circuit provides a constant output voltage to the remote unit up to a predetermined maximum current value, at which point the circuit provides a constant current at the maximum current value; and
   at least one fault detection circuit coupled to the current sensor for detecting a current fault condition on the power distribution line, and for generating a fault signal coupled to the power switch for preventing current flow onto the power distribution line when a current fault condition is sensed.

2. The circuit of claim 1, wherein the remote unit is an optical network unit.

3. The circuit of claim 1, wherein the power hub supplies DC power over the power distribution line to the remote unit.

4. The circuit of claim 1, wherein the power switch is an IGBT and the current sensor is a resistor.

5. The circuit of claim 4, wherein the collector of the IGBT is coupled to the power hub, the emitter of the IGBT is coupled to one side of the resistor, and the other side of the resistor is coupled to the power distribution line.

6. The circuit of claim 1, wherein the voltage developed across the current sensor biases the power switch into saturation at the predetermined maximum current value.

7. The circuit of claim 1, wherein the current fault condition is a surge current fault condition.

8. The circuit of claim 1, wherein the current fault condition is an AC line-cross current fault condition.

9. The circuit of claim 1, wherein the at least one fault detection circuit is configured to detect both a surge current fault condition and an AC line-cross current fault condition.

10. The circuit of claim 1, further comprising:
    a reverse current protection device coupled across the power switch.

11. The circuit of claim 1, wherein the circuit is located within the power hub.

12. The circuit of claim 1, wherein the circuit is located within the remote unit.

13. An active current limiter coupled between a power source and a load, comprising:
    a power switch coupled between the power source and the load;
    a current sensor coupled in series with the power switch for sensing a current level flowing through the power switch, wherein the current sensor biases the gate of the power switch so that the active current limiter provides a constant output voltage to the load up to a predetermined maximum current value, at which point the circuit provides a constant current to the load at the maximum current value; and
    fault detection circuit coupled to the current sensor and the power switch for detecting a current fault condition between the power switch and the load, and for preventing current flowing into the load.

14. The active current limiter of claim 13, wherein the current sensor is a resistor.

15. The active current limiter of claim 13, wherein the power switch is an insulated-gate bipolar transistor.

16. The active current limiter of claim 15, wherein the current sensor is a resistor.

17. The active current limiter of claim 13, wherein the current fault condition is a surge current fault condition.

18. The active current limiter of claim 13, wherein the current fault condition is an AC line-cross current fault condition.

19. The active current limiter of claim 13, wherein the fault detection circuit is configured to detect both a surge current fault condition and an AC line-cross fault condition.

* * * * *